US012786730B2

(12) United States Patent
Atawia

(10) Patent No.: US 12,786,730 B2
(45) Date of Patent: Nov. 3, 2026

(54) MULTI-USER MULTIPLE INPUT MULTIPLE OUTPUT (MU-MIMO) AWARE DYNAMIC SPECTRUM SHARING

(71) Applicant: Telefonaktiebolaget LM Ericsson (publ), Stockholm (SE)

(72) Inventor: Ramy Atawia, Kanata (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 381 days.

(21) Appl. No.: 18/264,497

(22) PCT Filed: Feb. 10, 2021

(86) PCT No.: PCT/IB2021/051095

§ 371 (c)(1),
(2) Date: Aug. 7, 2023

(87) PCT Pub. No.: WO2022/172056

PCT Pub. Date: Aug. 18, 2022

(65) Prior Publication Data

US 2024/0048996 A1 Feb. 8, 2024

(51) Int. Cl.
*H04W 16/14* (2009.01)
*H04B 7/0452* (2017.01)
*H04W 72/12* (2023.01)

(52) U.S. Cl.
CPC .......... *H04W 16/14* (2013.01); *H04B 7/0452* (2013.01); *H04W 72/1215* (2013.01)

(58) Field of Classification Search
CPC ... H04W 76/19; H04W 72/231; H04W 76/15; H04W 24/08; H04W 72/046;
(Continued)

(56) References Cited

U.S. PATENT DOCUMENTS

2009/0059856 A1 3/2009 Kermoal et al.
2009/0303952 A1* 12/2009 Hosokawa .......... H04W 72/542 455/39
(Continued)

FOREIGN PATENT DOCUMENTS

CN 103222205 A 7/2013
CN 111316749 A 6/2020
(Continued)

OTHER PUBLICATIONS

International Search Search Report and Written Opinion dated Nov. 19, 2021 issued in PCT Application No. PCT/IB2021/051095 filed Feb. 10, 2021, consisting of 13 pages.
(Continued)

*Primary Examiner* — Malick A Sohrab
(74) *Attorney, Agent, or Firm* — Weisberg I.P. Law, P.A.

(57) ABSTRACT

A method and network node for multi-user multiple input multiple output (MU-MIMO) dynamic spectrum sharing are disclosed. According to one aspect, a method implemented in a network node may include determining a spectral efficiency of each of the RATs based at least in part on multi-user multiple input multiple output, MU-MIMO capabilities of at least a second network node and wireless devices, WD, using a corresponding RAT. The method may also include splitting the spectrum to be shared among the RATs based at least in part on the determined spectral efficiency of each RAT.

20 Claims, 6 Drawing Sheets

(58) Field of Classification Search
CPC ... H04L 5/0048; H04L 5/0023; H04L 5/0094; H04B 7/06964; H04B 7/024
See application file for complete search history.

(56) References Cited

U.S. PATENT DOCUMENTS

| | | | | |
|---|---|---|---|---|
| 2011/0075586 | A1 | 3/2011 | Hu et al. | |
| 2013/0210447 | A1 * | 8/2013 | Moe | H04W 72/52 455/453 |
| 2017/0048823 | A1 * | 2/2017 | Bharadwaj | H04W 72/04 |
| 2017/0064718 | A1 * | 3/2017 | Bharadwaj | H04B 7/0452 |
| 2020/0344761 | A1 * | 10/2020 | Amuru | H04L 27/2607 |
| 2021/0258977 | A1 * | 8/2021 | Stephenne | H04W 16/14 |
| 2022/0104027 | A1 * | 3/2022 | Gao | H04W 28/16 |
| 2022/0240269 | A1 * | 7/2022 | Minotani | H04W 16/28 |

FOREIGN PATENT DOCUMENTS

| | | | | |
|---|---|---|---|---|
| WO | WO-2019234478 | A1 * | 12/2019 | H04W 72/1215 |
| WO | 2020/136416 | A1 | 7/2020 | |
| WO | 2021/019517 | A1 | 2/2021 | |

OTHER PUBLICATIONS

Chinese Office Action and English machine translation dated Jun. 6, 2026 for Application No. 202180093504.0, consisting of 18 pages.

3GPP TSG RAN WG1 Meeting #57bis R1-092318; Title: DL non-coherent multi-user MIMO joint transmission (MU-MIMO JT) scheme and system performance evaluations in TDD systems; Source: Alcatel-Lucent Shanghai Bell, Alcatel-Lucent; Agenda Item: 15.2; Document for: Discussion; Location and Date: Los Angeles, CA, USA Jun. 29, 2009-Jul. 3, 2009, consisting of 5 pages.

* cited by examiner

MULTI-USER MULTIPLE INPUT MULTIPLE OUTPUT (MU-MIMO) AWARE DYNAMIC SPECTRUM SHARING

CROSS-REFERENCE TO RELATED APPLICATION

This application is a Submission Under 35 U.S.C. § 371 for U.S. National Stage Patent Application of International Application Number: PCT/IB2021/051095, filed Feb. 10, 2021 entitled "MULTI-USER MULTIPLE INPUT MULTIPLE OUTPUT (MU-MIMO) AWARE DYNAMIC SPECTRUM SHARING," the entirety of which is incorporated herein by reference.

TECHNICAL FIELD

The present disclosure relates to wireless communication and in particular, to multi-user multiple input multiple output (MU-MIMO) dynamic spectrum sharing.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs.

Dynamic spectrum sharing allows operators to introduce new radio access technologies (RAT), for example, NR, using the existing spectrum and hardware which is utilized by an existing RAT, for example, LTE. This is done by splitting the radio resources between both RATs in order to serve the different types of users.

In one known approach, the network node decides on lending radio resources to a neighboring network with scarce resources based on the predicted network load, interference level, vacant resources, homogeneity of both networks.

In another known approach, non-exclusive sharing of the spectrum is allowed between different nodes that sense the same spectrum as un-occupied. Such algorithm is only feasible for non-co-located nodes where the spatial separation provides an opportunity for simultaneous transmission and contention resolution at an acceptable interference level.

In another approach, an algorithm that considers QoS satisfaction of both RATs while splitting the shared spectrum is provided. However, the splitting does not consider the difference in spectral efficiency due to RAT beamforming capabilities resulting in either lower QoS satisfaction of one RAT or underutilization of resources.

The existing solutions suffer from at least one of the following:

- they do not guarantee the fairness of resource distribution between different nodes since it is always assumed that there is a primary side that owns the spectrum and lends resources to the secondary node; and/or
- they provide lower spectral efficiency by overcommitting resources to the new RAT which is usually deployed on new network nodes with high beamforming capabilities and serving WDs with advanced channel sensing techniques that enable MU-MIMO pairing.

SUMMARY

Some embodiments advantageously provide a method and system for multi-user multiple input multiple output (MU-MIMO) dynamic spectrum sharing.

FIG. 1 illustrates a scenario where an LTE cell (Cell 1) is sharing the same spectrum with an NR Cell (Cell 2). The former (LTE) has limited beamforming capabilities and therefore the UEs, L1 and L2, are served with a wide beam and cannot be paired in one MU-MIMO group. On the other hand, Cell 2 (NR cell) has the capability of beamforming the user data into three different directions and thus the users N1, N2 and N3, can be co-scheduled and served with the same amount of resources by utilizing their spatial diversity. Existing dynamic spectrum sharing solutions overlook such capability and split the spectrum between LTE and NR in the ratio of 2:3, respectively. However, the 3 NR users only require one set of resources, and therefore the spectrum allocation that achieves user fairness is 2:1 instead of 2:3.

Some embodiments disclosed herein may include one or more of the following steps:

1) Assess the spectral efficiency of each RAT as a function of MU-MIMO capabilities of network nodes;
2) configure a network node to split the shared spectrum based at least in part on the assessed spectral efficiency of each RAT; and/or
3) provide feedback to the controller or network node to improve future decisions based at least in part on the measured MU-MIMO outcome of each RAT.

Some embodiments may provide one or more of the following advantages:

1) quality of service (QoS) fairness between user devices of the different RATs; and/or
2) higher spectral efficiency of the shared carrier by avoiding overcommitting resources to the new RAT with higher beamforming and sensing techniques.

According to one aspect, a method in a first network node configured to share a spectrum between different radio access technologies (RATs) is provided. The method includes determining a spectral efficiency of each of the RATs based at least in part on multi-user multiple input multiple output (MU-MIMO) capabilities of at least a second network node and wireless devices (WD), using a corresponding RAT. The method also includes splitting the spectrum to be shared among the RATs based at least in part on the determined spectral efficiency of each RAT.

According to this aspect, in some embodiments, the determining of a spectral efficiency includes collecting data from different network nodes operating according to different RATs. In some embodiments, the determining of a spectral efficiency includes comparing a current spectrum allocation to each RAT to achieve a user throughput fairness. In some embodiments, the determining of a spectral efficiency includes constructing MU-MIMO groups for each RAT, of WDs that are spatially separated. In some embodiments, the determining of a spectral efficiency includes determining a scheduling priority for each group. In some embodiments, the determining of a spectral efficiency includes determining a traffic load for each group. In some embodiments, the spectrum splitting includes allocating the spectrum to each group until a traffic load for each group is served or there is no longer available spectrum. In some embodiments, the determining of a spectral efficiency includes determining a MU-MIMO based utility function for each RAT, a utility function for a RAT being based at least in part on at least one of a number of MU-MIMO groups in the RAT, an average MU-MIMO group size, and a total traffic requested by WDs served by each RAT. In some embodiments, the spectrum splitting includes comparing the utility function for each RAT and allocating resources to each RAT based at least in part on the comparison. In some embodiments, the allocating of resources to a RAT is based at least in part on a previous allocation of resources to the RAT.

According to another aspect, a first network node configured to share a spectrum between different radio access technologies (RATs) is provided. The first network node includes processing circuitry configured to: determine a spectral efficiency of each of the RATs based at least in part on multi-user multiple input multiple output (MU-MIMO) capabilities of at least a second network node and wireless devices (WD) using a corresponding RAT; and split the spectrum to be shared among the RATs based at least in part on the determined spectral efficiency of each RAT.

According to this aspect, in some embodiments, the determining of a spectral efficiency includes collecting data from different network nodes operating according to different RATs. In some embodiments, the determining of a spectral efficiency includes comparing a current spectrum allocation to each RAT to achieve a user throughput fairness. In some embodiments, the determining of a spectral efficiency includes constructing MU-MIMO groups for each RAT, of WDs that are spatially separated. In some embodiments, the determining of a spectral efficiency includes determining a scheduling priority for each group. In some embodiments, the determining of a spectral efficiency includes determining a traffic load for each group. In some embodiments, the spectrum splitting includes allocating the spectrum to each group until a traffic load for each group is served or there is no longer available spectrum. In some embodiments, the determining of a spectral efficiency includes determining a MU-MIMO based utility function for each RAT, a utility function for a RAT being based at least in part on at least one of a number of MU-MIMO groups in the RAT, an average MU-MIMO group size, and a total traffic requested by WDs served by each RAT. In some embodiments, the spectrum splitting includes comparing the utility function for each RAT and allocating resources to each RAT based at least in part on the comparison. In some embodiments, the allocating of resources to a RAT is based at least in part on a previous allocation of resources to the RAT.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
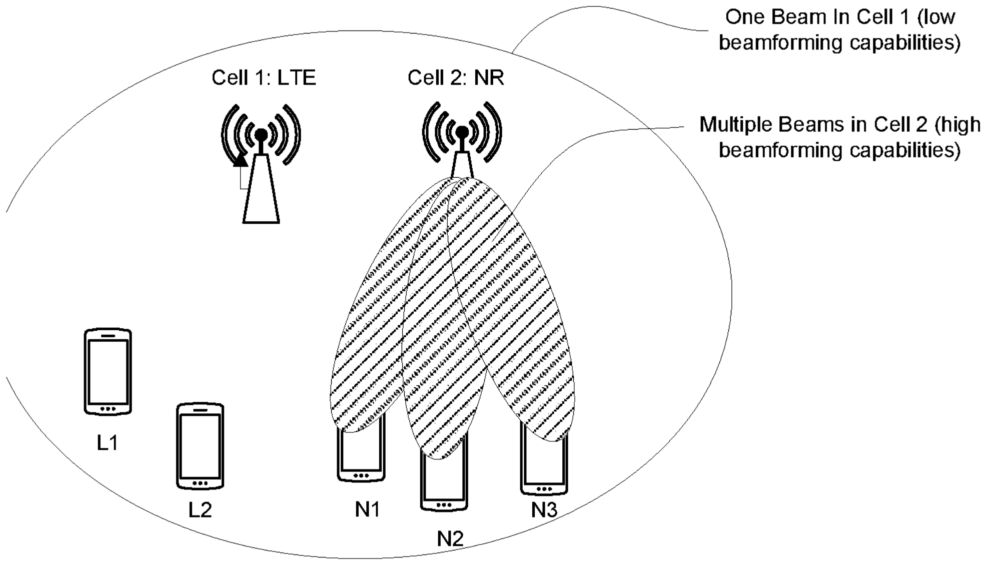
FIG. 1 illustrates an LTE cell with low beamforming capability and an NR cell with high beamforming capability.

Before describing in detail example embodiments, it is noted that the embodiments reside primarily in combinations of apparatus components and processing steps related to multi-user multiple input multiple output (MU-MIMO) dynamic spectrum sharing. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The term "network node" used herein can be any kind of network node comprised in a radio network which may further comprise any of base station (BS), radio base station, base transceiver station (BTS), base station controller (BSC), network controller, radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments are directed to multi-user multiple input multiple output (MU-MIMO) dynamic spectrum sharing. According to one aspect, a method implemented in a network node may include determining a spectral efficiency of each of the RATs based at least in part on multi-user multiple input multiple output, MU-MIMO capabilities of at least a second network node and wireless devices, WD, using a corresponding RAT. The method may also include splitting the spectrum to be shared among the RATs based at least in part on the determined spectral efficiency of each RAT.

Figure 2:
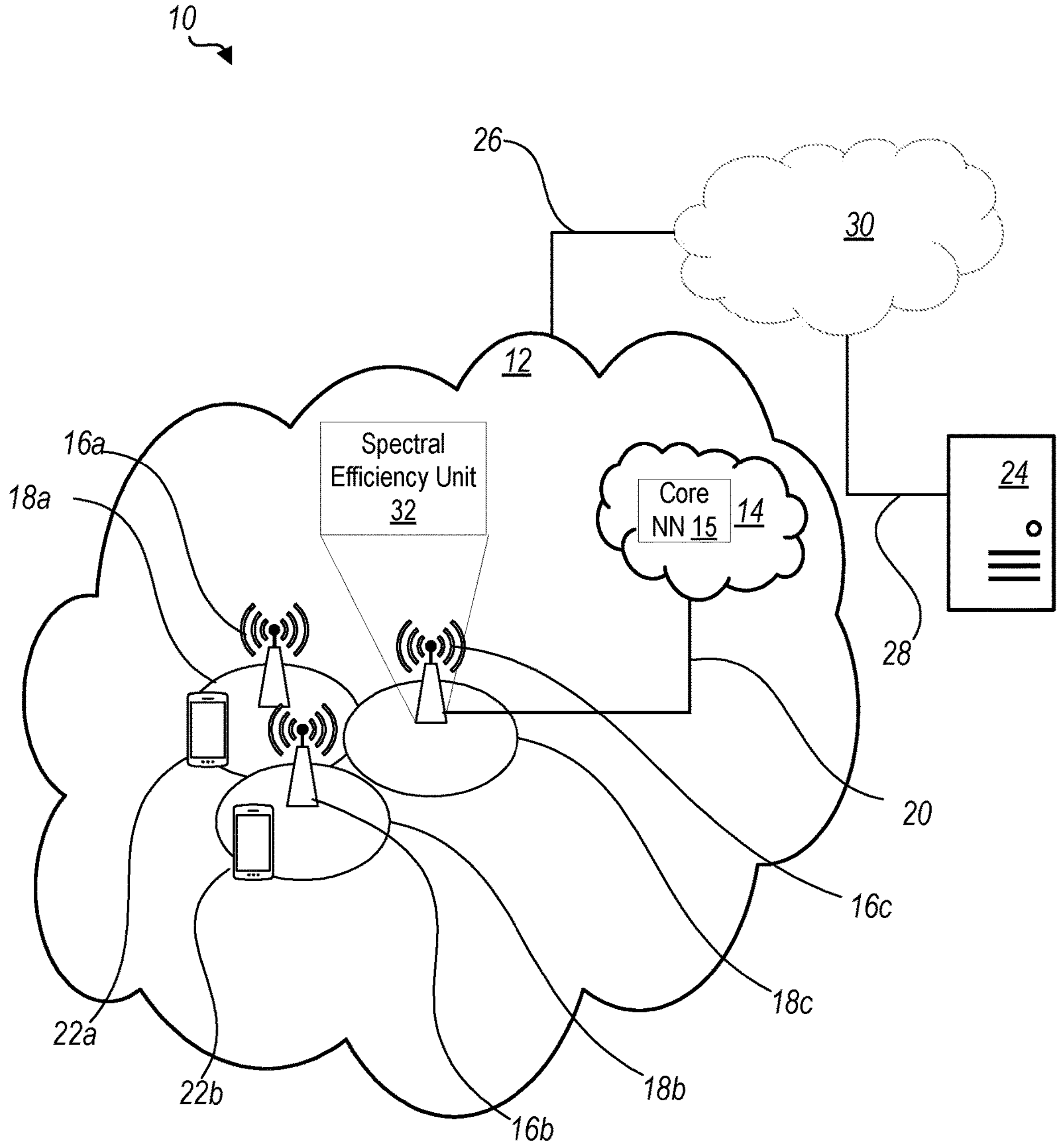
FIG. 2 is a schematic diagram of an example network architecture illustrating a communication system according to principles disclosed herein.
Figure 4:
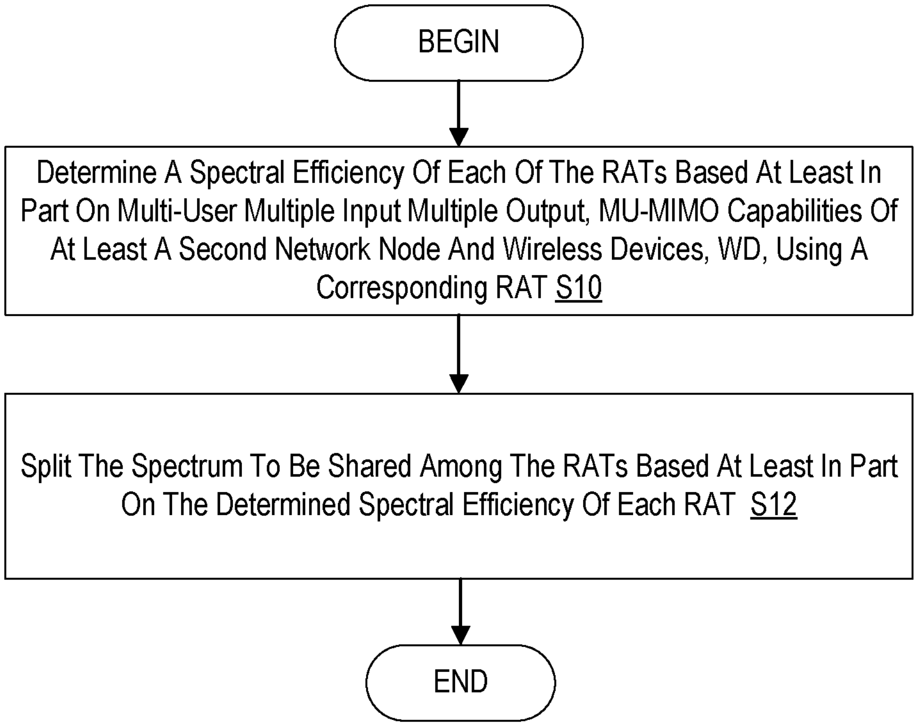
FIG. 4 is a flowchart of an example process in a network node for multi-user multiple input multiple output (MU-MIMO) dynamic spectrum sharing.
Figure 5:
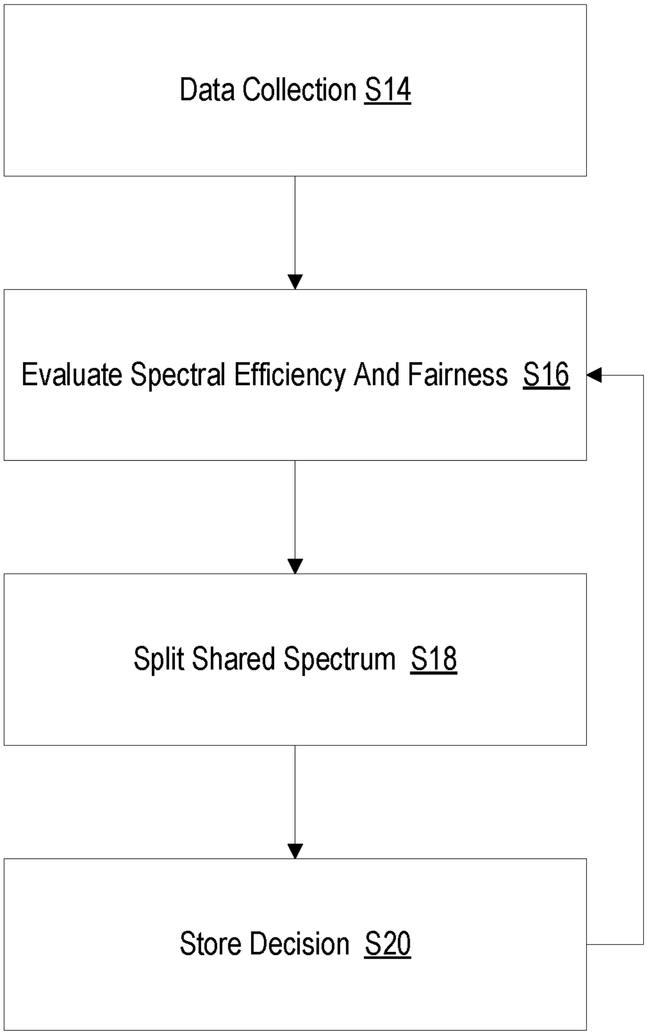
FIG. 5 is a flowchart of another example process in a network node for multi-user multiple input multiple output (MU-MIMO) dynamic spectrum sharing.
Figure 6:
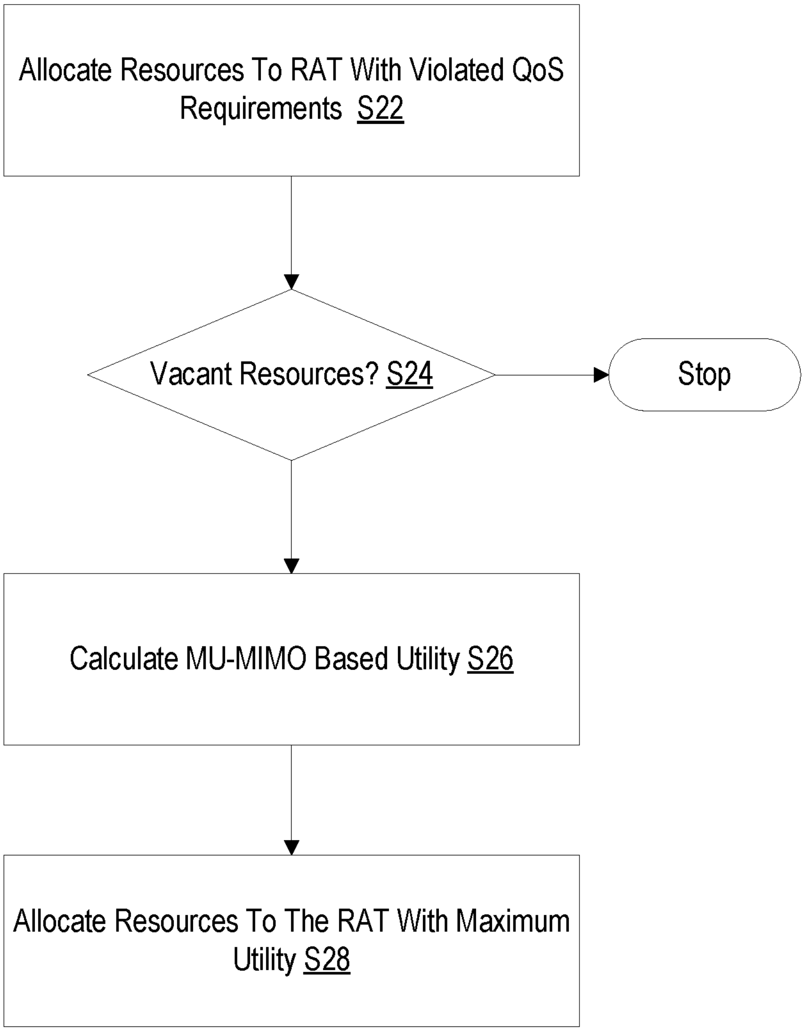
FIG. 6 is a flowchart of yet another example process in a network node for multi-user multiple input multiple output (MU-MIMO) dynamic spectrum sharing.

Returning again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14 which may comprise a core network node 15, which may be configured with functionality described below with reference to FIGS. 4-6. The access network 12 comprises a plurality of network nodes **16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). It is noted that any one or more of the network nodes 16 may be configured to have the functionality described below with reference to FIGS. 4-6. Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16**.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 (eNB or gNB) is configured to include a spectral efficiency unit 32 which is configured to determine a spectral efficiency of each of the RATs based at least in part on multi-user multiple input multiple output, MU-MIMO capabilities of at least a second network node and wireless devices, WD, using a corresponding RAT. The network node 16 may is also configured to include a spectrum splitter 56 which is configured to split the spectrum to be shared among the RATs based at least in part on the determined spectral efficiency of each RAT. In alternative embodiments, the spectral efficiency unit 32 and/or the spectrum splitter 56 may be implemented at the core network node 15.

Example implementations, in accordance with an embodiment, of the WD 22, network node 16 and host computer 24 discussed in the preceding paragraphs will now be described with reference to FIG. 3.

The communication system 10 includes a network node 16 provided in a communication system 10 and including hardware 38 enabling it to communicate with the WD 22.

The hardware 38 may include a radio interface 42 for setting up and maintaining at least a wireless connection 46 with a WD 22 located in a coverage area 18 served by the network node 16. The radio interface 42 may be formed as or may include, for example, one or more RF transmitters, one or more RF receivers, and/or one or more RF transceivers. The radio interface 42 includes an array of antennas 43 to radiate and receive signal carrying electromagnetic waves.

In the embodiment shown, the hardware 38 of the network node 16 further includes processing circuitry 48. The processing circuitry 48 may include a processor 50 and a memory 52. In particular, in addition to or instead of a processor, such as a central processing unit, and memory, the processing circuitry 48 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 50 may be configured to access (e.g., write to and/or read from) the memory 52, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 44 stored internally in, for example, memory 52, or stored in external memory (e.g., database, storage array, network storage device, etc.) accessible by the network node 16 via an external connection. The software 44 may be executable by the processing circuitry 48. The processing circuitry 48 may be configured to control any of the methods and/or processes described herein and/or to cause such methods, and/or processes to be performed, e.g., by network node 16. Processor 50 corresponds to one or more processors 50 for performing network node 16 functions described herein. The memory 52 is configured to store data, programmatic software code and/or other information described herein. In some embodiments, the software 44 may include instructions that, when executed by the processor 50 and/or processing circuitry 48, causes the processor 50 and/or processing circuitry 48 to perform the processes described herein with respect to network node 16. For example, processing circuitry 48 of the network node 16 may include a spectral efficiency unit 32 which is configured to determine a spectral efficiency of each of the RATs based at least in part on multi-user multiple input multiple output, MU-MIMO capabilities of at least a second network node and wireless devices, WD, using a corresponding RAT. The network node 16 may also be configured to include a spectrum splitter 56 which is configured to split the spectrum to be shared among the RATs based at least in part on the determined spectral efficiency of each RAT. The network node 16 may also include a communication interface 58 which enables communication between the network node 16 and the core network node 15.

The communication system 10 may also include the core network node 15 which may perform any one or more of the functions attributable to the network node 16. In particular, the core network node 15 includes processing circuitry 74 which includes memory 76 and processor 78. The processor 78 may execute software instructions stored in the memory 76 to implement the functions of the spectral efficiency unit 80, and to implement the functions of the spectrum splitter 82. The functions performed by the spectral efficiency unit 80 may include functions ascribed herein to the spectral efficiency unit 32. The functions performed by the spectrum splitter 82 may include functions ascribed herein to the spectrum splitter 56. The core network node 15 also includes a communication interface 84 which enables communication between the core network node 15 and the network node 16.

The communication system 10 further includes the WD 22 already referred to. The WD 22 may have hardware 60 that may include a radio interface 62 configured to set up and maintain a wireless connection 46 with a network node 16 serving a coverage area 18 in which the WD 22 is currently located. The radio interface 62 may be formed as or may include, for example, one or more RF transmitters, one or more RF receivers, and/or one or more RF transceivers. The radio interface 62 includes an array of antennas 63 to radiate and receive signal carrying electromagnetic waves.

The hardware 60 of the WD 22 further includes processing circuitry 64. The processing circuitry 64 may include a processor 66 and memory 68. In particular, in addition to or instead of a processor, such as a central processing unit, and memory, the processing circuitry 64 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 66 may be configured to access (e.g., write to and/or read from) memory 68, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 70, which is stored in, for example, memory 52 at the WD 22, or stored in external memory (e.g., database, storage array, network storage device, etc.) accessible by the WD 22. The software 70 may be executable by the processing circuitry 64. The software 70 may include a client application 72. The client application 72 may be operable to provide a service to a human or non-human user via the WD 22.

The processing circuitry 64 may be configured to control any of the methods and/or processes described herein and/or to cause such methods, and/or processes to be performed, e.g., by WD 22. The processor 66 corresponds to one or more processors 66 for performing WD 22 functions described herein. The WD 22 includes memory 68 that is configured to store data, programmatic software code and/or other information described herein. In some embodiments, the software 70 and/or the client application 72 may include instructions that, when executed by the processor 66 and/or processing circuitry 64, causes the processor 66 and/or processing circuitry 64 to perform the processes described herein with respect to WD 22.

Figure 3:
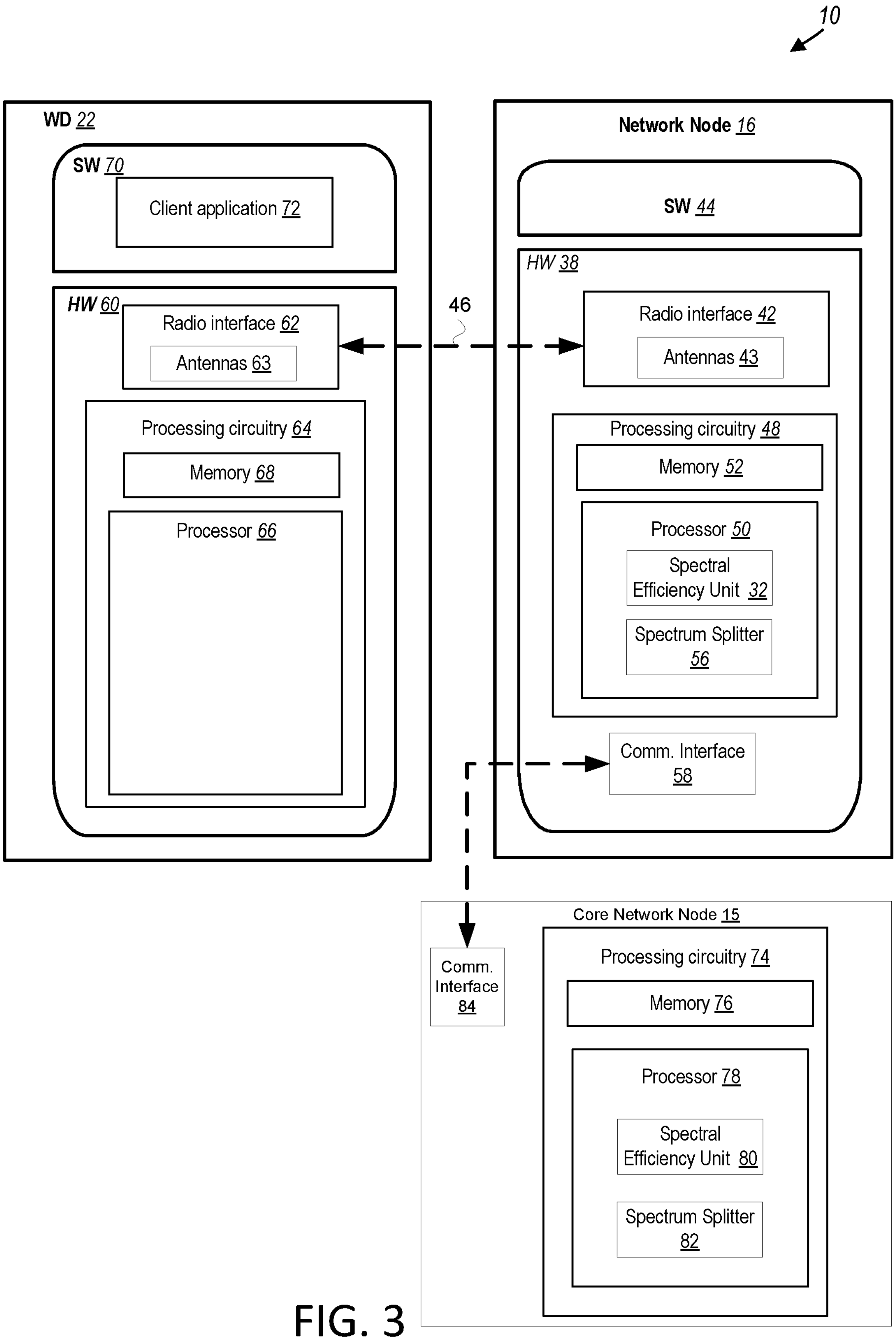
FIG. 3 is a block diagram of a network node in communication with a wireless device over a wireless connection according to some embodiments of the present disclosure.

In some embodiments, the inner workings of the network node 16 and WD 22 may be as shown in FIG. 3 and independently, the surrounding network topology may be that of FIG. 2.

The wireless connection 46 between the WD 22 and the network node 16 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve.

Although FIGS. 2 and 3 show various "units" such as spectral efficiency unit 32 and spectrum splitter 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 4 is a flowchart of an example process in a core network node 15 or network node 16 for multi-user multiple input multiple output (MU-MIMO) dynamic spectrum sharing. One or more blocks described herein may be performed by one or more elements of network node 15, 16 such as by one or more of processing circuitry 48, 74 (including the spectral efficiency unit 32, 80 and spectrum splitter 56, 82), processor 50, 78, and/or radio interface 42. Network node 15, 16 such as via processing circuitry 48, 74 and/or processor 50, 78 and/or radio interface 42 is configured to determine a spectral efficiency of each of the RATs based at least in part on multi-user multiple input multiple output, MU-MIMO capabilities of at least a second network node and wireless devices, WD, using a corresponding RAT (Block S10). The process further includes splitting the spectrum to be shared among the RATs based at least in part on the determined spectral efficiency of each RAT (Block S12).

Having described the general process flow of arrangements of the disclosure and having provided examples of hardware and software arrangements for implementing the processes and functions of the disclosure, the sections below provide details and examples of arrangements for multi-user multiple input multiple output (MU-MIMO) dynamic spectrum sharing. Reference is made below to users, such as LTE users and NR users. In this context, "user" refers to a WD 22 in communication with a network node 16.

In some embodiments, the following steps may be implemented, as shown in FIG. 5: data collection (Block S14), spectral efficiency and fairness evaluation (Block S16), shared spectrum splitting (Block S18); and decision storing (Block S20). These steps may be performed by processing circuitry 48, 74 of the network node 15, 16.

- Data collection: In this first step, the network node 15, 16 collects information from both the nodes (with different RATs) sharing the same spectrum. Such information may contain:
  - The traffic load for each WD 22 (e.g., buffer size);
  - The beamforming capabilities of the node operating with this RAT (e.g., number of antennas and number of ports); and/or
  - MU-MIMO capabilities of each RAT such as the number of paired (i.e., co-scheduled) users.
- Evaluate spectral efficiency and fairness: The network node 15, 16 decides whether the current spectrum allocation to each RAT satisfies one or more of the following criteria:
  - User throughput fairness calculated as, for instance, the minimum data rate achieved among the users of all RATs; and/or
  - Spectral efficiency calculated as, for instance, the ratio between delivered data (in bits) to the total allocated spectrum.
- Split shared spectrum: In the case of violating the above criteria, the network node 15, 16 can recalculate the radio of spectrum allocated to each RAT; and/or
- Store decision: in this step, the network node 15, 16 stores the latest spectrum sharing decision in order to use it for correcting a future decision.

Some example embodiments will now be further explained.

Embodiment 1: User-Level Based Splitting

In this embodiment, either one of the network nodes 16 (cells) sharing the same spectrum or a central node (e.g., core network node 15) gathers the beamforming and MU-MIMO information of all users and may decide on the split spectrum in the following steps:

- Collect the following information:
  - X: set of LTE users, each user index=x, precoder matrix indicator (PMI)=$y_x$, and priority=$z_x$;
  - A: set of NR users, each user index=a, and PMI=$b_a$, and priority=$c_a$;
- Construct MU-MIMO groups in LTE:
  - Group LTE users who are spatially separated and thus can be co-scheduled simultaneously;
  - For instance, grouping can be done based on PMI of each user;
  - This step will result in distributing each user x into one of the $G^{(L)}$ MU-MIMO groups, where each group is denoted by $g^{(N)} \in G^{(N)}$;
- Construct MU-MIMO groups in NR:
  - Similarly, group each NR user a into one of the $G^{(N)}$ groups where each group is denoted by $g^{(N)} \in G^{(N)}$;
- Calculate group priority:
  - The scheduling priority of each group $g^{(N)}$ or $g^{(L)}$ is determined as a function of the priority of the users forming this group using one of the following functions:
  - Option A: average priority of users:

$$Q_{g^{(L)}} = \frac{1}{\sum_{x\in X}\delta_{x,g}} \sum_{x\in X} z_x \delta_{x,g};$$

where $\delta_{x,g}=1$ if user x is in group g, and equals to 0 otherwise;
  - Option B: maximum priority of users:

$$Q_{g^{(L)}} = \max_{\forall x\in X}(z_x \delta_{x,g});$$

Option C: number of users in this group: $Q_g^{(L)} = \Sigma_{x\in X}\delta_{x,g}$;
  - Options A to C can be used also for calculating the priority of NR MU-MIMO groups $Q_{g^{(N)}}$;
- Calculate the traffic load of each group:
  - This can be calculated as the maximum traffic load of the users forming this group, and denoted by $d_{g(L)}$ and $d_{g(N)}$;
- Spectrum splitting:
  - The groups $g^{(L)}$ and $g^{(N)}$ are arranged in a descending order of priority;
  - Start allocating the spectrum to the group with the top priority until the traffic load is served or there is no longer vacant spectrum; and/or
  - The group with the top priority is removed from the list and the second highest priority group is selected for allocation, and so on.

Embodiment 2: RAT-Level Based Splitting

Unlike the first embodiment, this embodiment uses aggregated MU-MIMO information from each RAT to avoid complexity associated with the user level (i.e., Embodiment 1) specially in highly loaded systems. The main steps of this Embodiment 2 are depicted in FIG. 6, and may be performed by the processing circuitry 48 of the network node 16, and/or the processing circuitry 74 of the core network node 15. These steps are summarized as follows:

Each RAT reports the following information to the core network node 15 or a network node 16:
- $M^{(L)}$ and $M^{(N)}$: number of MU-MIMO groups in LTE and NR, respectively;
- $S^{(L)}$ and $S^{(N)}$: average MU-MIMO group size in LTE and NR, respectively;
- $D^{(L)}$ and $D^{(N)}$: Total traffic requested by LTE and NR users, respectively; and/or
- $Q^{(L)}$ and $Q^{(N)}$: Boolean indicator if the QoS is violated in LTE and NR, respectively.

Algorithm:
- Step 1: Check QoS satisfaction of each RAT (Block S22):
  - If one RAT (e.g., LTE) has some user requests with delay or minimum throughput requirements, then the amount of resources has to be given to such RAT;
  - Else, proceed to step 2;
- Step 2: Check for vacant resources (Block S24):
  - If there are no resources left to be shared between both RATs, then the algorithm stops;
  - Else, go to step 3;
- Step 3: Define MU-MIMO based utility functions as follows (Block S26):
  - LTE utility function: U(L)=D(L)/(S(L)*M(L)); and/or
  - NR utility function: U(N)=D(N)/(S(N)*M(N));
- Step 4: Allocate resources to the RAT with higher utility function (Block S28):
  - If $U^{(L)}>U^{(N)}$;
    - Allocate resources to LTE;
  - Else;
  - Allocate resources to NR.

Embodiment 3: Robust RAT-Level Based Splitting

This is an extension to embodiment 2 where the aggregated MU-MIMO information from each RAT might be erroneous due to the time varying radio and traffic conditions, and therefore step 4 can be corrected as follows:

If $U^{(L)}>U^{(N)}$
- Allocate W % of resources to LTE, and (100−W) % of resources to NR, Else
- Allocate W % of resources to NR, and (100−W) % of resources to NR, where the value of W may be tracked over time as following:

$$W_t=0.9*W_{t-1}+0.1*\Delta t$$

and where Δt is the difference between the allocated resources to the RAT and the actual used by the users. Thus, if the RAT tends to co-schedule more users than what was initially assumed, and more resources are wasted, then the controller may correct the future decisions to reflect such uncertainty.

Some embodiments leverage MU-MIMO capability of RATs sharing the same spectrum to achieve user fairness and higher spectral efficiency. Some embodiments consider both QoS, priority of user traffic and the uncertainty in the MU-MIMO information in correcting the future decision.

According to one aspect, a method in a first network node 15, 16 configured to share a spectrum between different radio access technologies (RATs) is provided. The method includes determining, via the processing circuitry 48, 74, a spectral efficiency of each of the RATs based at least in part on multi-user multiple input multiple output (MU-MIMO) capabilities of at least a second network node 16 and wireless devices (WD) 22, using a corresponding RAT. The method also includes splitting, via the processing circuitry 48, 74, the spectrum to be shared among the RATs based at least in part on the determined spectral efficiency of each RAT.

According to this aspect, in some embodiments, the determining of a spectral efficiency includes collecting data from different network nodes operating according to different RATs. In some embodiments, the determining of a spectral efficiency includes comparing a current spectrum allocation to each RAT to achieve a user throughput fairness. In some embodiments, the determining of a spectral efficiency includes constructing MU-MIMO groups for each RAT, of WDs 22 that are spatially separated. In some embodiments, the determining of a spectral efficiency includes determining a scheduling priority for each group. In some embodiments, the determining of a spectral efficiency includes determining a traffic load for each group. In some embodiments, the spectrum splitting includes allocating the spectrum to each group until a traffic load for each group is served or there is no longer available spectrum. In some embodiments, the determining of a spectral efficiency includes determining a MU-MIMO based utility function for each RAT, a utility function for a RAT being based at least in part on at least one of a number of MU-MIMO groups in the RAT, an average MU-MIMO group size, and a total traffic requested by WDs served by each RAT. In some embodiments, the spectrum splitting includes comparing the utility function for each RAT and allocating resources to each RAT based on the comparison. In some embodiments, the allocating of resources to a RAT is based at least in part on a previous allocation of resources to the RAT.

According to another aspect, a first network node 15, 16 configured to share a spectrum between different radio access technologies (RATs) is provided. The first network node 15, 16 includes processing circuitry 48, 74 configured to: determine a spectral efficiency of each of the RATs based at least in part on multi-user multiple input multiple output (MU-MIMO) capabilities of at least a second network node 16 and wireless devices (WD) 22 using a corresponding RAT; and split the spectrum to be shared among the RATs based at least in part on the determined spectral efficiency of each RAT.

According to this aspect, in some embodiments, the determining of a spectral efficiency includes collecting data from different network nodes operating according to different RATs. In some embodiments, the determining of a spectral efficiency includes comparing a current spectrum allocation to each RAT to achieve a user throughput fairness. In some embodiments, the determining of a spectral efficiency includes constructing MU-MIMO groups for each RAT, of WDs 22 that are spatially separated. In some embodiments, the determining of a spectral efficiency includes determining a scheduling priority for each group. In some embodiments, the determining of a spectral efficiency includes determining a traffic load for each group. In some embodiments, the spectrum splitting includes allocating the spectrum to each group until a traffic load for each group is served or there is no longer available spectrum. In some embodiments, the determining of a spectral efficiency includes determining a MU-MIMO based utility function for each RAT, a utility function for a RAT being based at least in part on at least one of a number of MU-MIMO groups in the RAT, an average MU-MIMO group size, and a total traffic requested by WDs served by each RAT. In some embodiments, the spectrum splitting includes comparing the utility function for each RAT and allocating resources to each RAT based on the comparison. In some embodiments, the allocating of resources to a RAT is based at least in part on a previous allocation of resources to the RAT.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a first network node for sharing a spectrum among different radio access technologies, RATs, the method comprising:

allocating the spectrum among the different RATs;

determining a spectral efficiency of respective RATs based at least in part on one or both of a number of multi-user multiple input multiple output, MU-MIMO, groups and an average MU-MIMO group size for wireless devices, WDs, using a corresponding radio access technology, RAT, the WDs being served by at least a second network node;

evaluating whether a current allocation of the spectrum among the respective RATs satisfies one or more criteria including user throughput fairness and the spectral efficiency; and in response to determining that the one or more criteria are violated, splitting the spectrum among the different RATs based at least in part on the spectral efficiency determined, by recalculating a ratio of the spectrum allocated to the respective RATs.

2. The method of claim 1, wherein determining the spectral efficiency includes collecting data from different network nodes operating according to the different RATs.

3. The method of claim 1, wherein determining the spectral efficiency includes comparing the spectrum allocated among the respective RATS to achieve the user throughput fairness.

4. The method of claim 1, wherein determining the spectral efficiency includes constructing respective MU- MIMO groups for the different RATs, the respective MU-MIMO groups including WDs that are spatially separated.

5. The method of claim 4, wherein determining the spectral efficiency includes determining a scheduling priority for the respective MU-MIMO groups.

6. The method of claim 4, wherein determining the spectral efficiency includes determining a traffic load for the respective MU-MIMO groups.

7. The method of claim 4, wherein splitting the spectrum includes allocating the spectrum to the respective MU-MIMO groups until a traffic load for the respective MU-MIMO groups is served or there is no longer available spectrum.

8. The method of claim 4, wherein determining the spectral efficiency includes determining respective MU-MIMO based utility functions for the different RATs, a respective MU-MIMO utility function for a respective RAT being based on at least one of the number of MU-MIMO groups in the respective RAT, the average MU-MIMO group size, and a total traffic requested by WDs served by the respective RAT.

9. The method of claim 8, wherein splitting the spectrum includes comparing the respective MU-MIMO based utility functions for the respective RATs, and based at least in part on the comparing, allocating resources to the respective RATs.

10. The method of claim 9, wherein allocating resources to the respective RATs is based at least in part on previous allocation of resources to the respective RATs.

11. A first network node configured to share a spectrum among different radio access technologies, RATs, the first network node comprising processing circuitry configured to:

allocate the spectrum among the different RATs;

determine a spectral efficiency of the respective RATs based at least in part on one or both of a number of multi-user multiple input multiple output, MU-MIMO, groups and an average MU-MIMO group size for wireless devices, WDs, using a corresponding radio access technology, RAT, the WDs being served by at least a second network node;

evaluate whether a current allocation of the spectrum among the respective RATs satisfies one or more criteria including user throughput fairness and the spectral efficiency; and in response to a determination that the one or more criteria are violated, split the spectrum among the different RATs based at least in part on the spectral efficiency determined, by recalculating a ratio of the spectrum allocated to the respective RATs.

12. The first network node of claim 11, wherein-determining the spectral efficiency includes collecting data from different network nodes operating according to the different RATs.

13. The first network node of claim 11, wherein-determining the spectral efficiency includes comparing the spectrum allocated among the respective RATs to achieve the user throughput fairness.

14. The first network node of claim 11, wherein determining the spectral efficiency includes constructing respective MU-MIMO groups for the different RATs, the respective MU-MIMO groups including WDs that are spatially separated.

15. The first network node of claim 14, wherein determining the spectral efficiency includes determining a scheduling priority for the respective MU-MIMO groups.

16. The first network node of claim 14, determining the spectral efficiency includes determining a traffic load for the respective MU-MIMO groups.

17. The first network node of claim 14, wherein splitting the spectrum includes allocating the spectrum to the respective MU-MIMO groups until a traffic load for the respective MU-MIMO groups is served or there is no longer available spectrum.

18. The first network node of claim 14, wherein-determining the spectral efficiency includes determining respective MU-MIMO based utility functions for the respective RATs, a respective MU-MIMO utility function for a respective RAT being based on at least one of the number of MU-MIMO groups in the respective RAT, the average MU-MIMO group size, and a total traffic requested by WDs served by the respective RAT.

19. The first network node of claim 18, wherein splitting the spectrum includes comparing the respective MU-MIMO based utility functions for the respective RATs, and based at least in part on the comparing, allocating resources to the respective RATs.

20. The first network node of claim 19, wherein allocating resources to the respective RATs is based at least in part on previous allocation of resources to the respective RATs.

* * * * *